March 28, 1939.  E. J. W. RAGSDALE ET AL  2,152,605

DECK HOUSE

Original Filed March 22, 1934  8 Sheets-Sheet 1

INVENTORS
EARL J.W. RAGSDALE
CHARLES B. CONWELL
BY THOMAS GIHON JORDAN

ATTORNEY.

March 28, 1939.   E. J. W. RAGSDALE ET AL   2,152,605
DECK HOUSE
Original Filed March 22, 1934   8 Sheets-Sheet 2

INVENTORS
EARL J. W. RAGSDALE
CHARLES B. CONWELL
THOMAS GIHON JORDAN
BY
ATTORNEY.

March 28, 1939.  E. J. W. RAGSDALE ET AL  2,152,605
DECK HOUSE
Original Filed March 22, 1934   8 Sheets-Sheet 5

INVENTORS
EARL J.W. RAGSDALE
CHARLES B. CONWELL
THOMAS GIHON JORDAN
BY
ATTORNEY.

March 28, 1939.  E. J. W. RAGSDALE ET AL  2,152,605

DECK HOUSE

Original Filed March 22, 1934  8 Sheets-Sheet 7

*INVENTORS*
EARL J.W. RAGSDALE
CHARLES B. CONWELL
THOMAS GIHON JORDAN.
BY
*ATTORNEY.*

March 28, 1939.  E. J. W. RAGSDALE ET AL  2,152,605
DECK HOUSE
Original Filed March 22, 1934   8 Sheets-Sheet 8

INVENTORS
EARL J.W. RAGSDALE
CHARLES B. CONWELL
THOMAS GIHON JORDAN
BY
ATTORNEY.

Patented Mar. 28, 1939

2,152,605

UNITED STATES PATENT OFFICE 2,152,605

DECK HOUSE

Earl J. W. Ragsdale, Norristown, Pa., Charles B. Conwell, Los Angeles, Calif., and Thomas Gihon Jordan, Philadelphia, Pa., assignors to Edward G. Budd Manufacturing Company, Philadelphia, Pa., a corporation of Pennsylvania Application March 22, 1934, Serial No. 716,837
Renewed September 2, 1938

6 Claims. (Cl. 189—34)

The present invention relates in general to sheet metal building structures and particularly to the fabrication of such structures from sheet stainless steel.

The general object is to provide a superstructure or deck housing for ships' decks or the like capable of being constructed of sheet stainless steel in a manner to take full advantage of its high tensile strength, noncorrodability and other qualities, while using a minimum amount of material thus minimizing weight and incidentally substantially offsetting the high cost of this relatively material.

Another object is to provide a novel construction of sheet metal paneling, and sheet metal beams, girders and posts capable of being readily constructed by spot welding, together with special joint structures, all of such elements being so cooperatively related in form and structure as to afford the fabrication of a complete superstructure including decks and housing with maximum strength and minimum weight.

A special object is the provision of a novel cambered beam construction permitting the construction of beams of any camber from identical structural elements and the provision of special joint constructions particularly adapted to the joinder of such beams with girders, posts and partitions.

Another object is the provision of an arrangement facilitating the joining of completed sections of the stainless steel superstructure together and to carbon steel portions of the ship.

Various other objects to be brought out as the description proceeds, look to the solution of various problems arising from the nature of the material used and seek to provide novel constructional forms and arrangements thereof utilizing to the greatest advantage the peculiar characteristics of stainless steel.

A more thorough understanding of the invention will be had upon reference to the following specification and the drawings accompanying the same.

Referring to the drawings in detail, the particular embodiment here chosen as an illustration is a portion of a ship's forward superstructure such as the decks and deck housings constituting the superstructure deck, navigation deck, etc., fabricated of stainless steel in accordance with the present invention, and in a manner to be readily joined on to existing carbon steel parts of a ship. It is to be understood, of course, that the invention is not limited to such particular kind of structure, but may be embodied in structures of various shapes and contours according to the intended use, the invention being concerned mainly with the wall and deck paneling and the framing which go to make up the complete superstructure of decks and deck housings.

Figure 3:
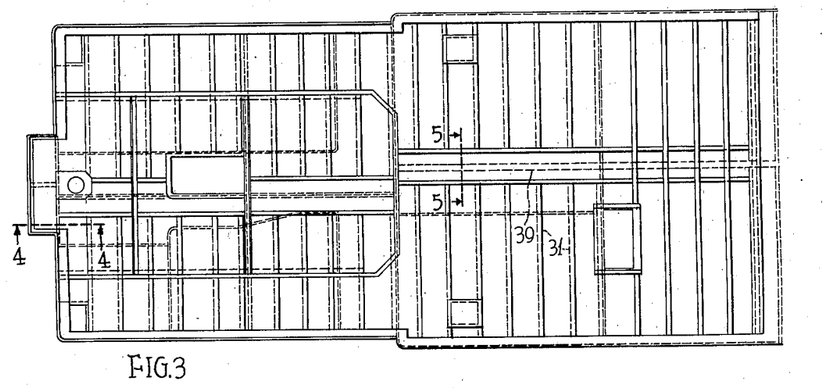
Fig. 3 is a top plan view of a deck constructed according to the invention.
Figure 4:
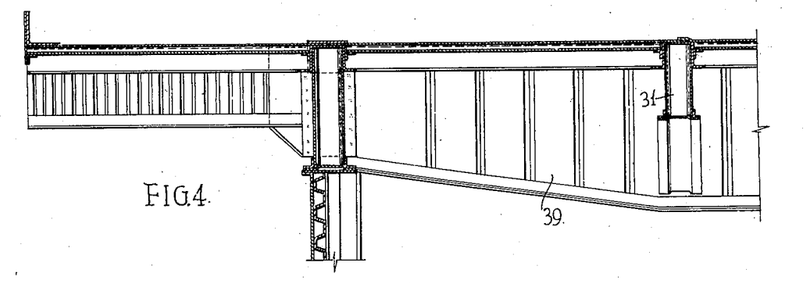
Fig. 4 is a fragmentary, enlarged section taken on the line 4—4 of Fig. 3.
Figures 7, 31:
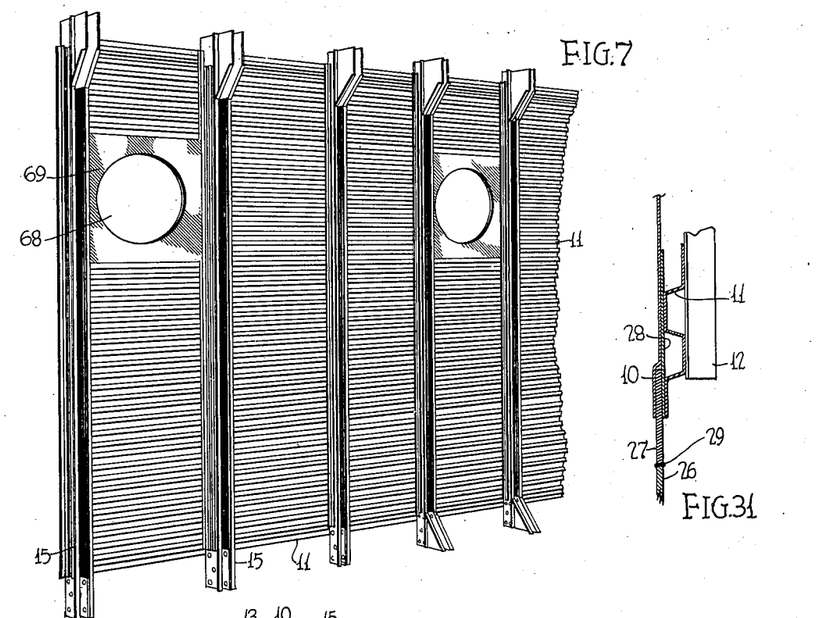
Fig. 7 is an inside persective view of a panel section with stiffening posts.
Figure 31 is a fragmentary sectional view showing a method of attachment of a stainless steel wall panel to a carbon steel coaming.
Figures 8, 18:
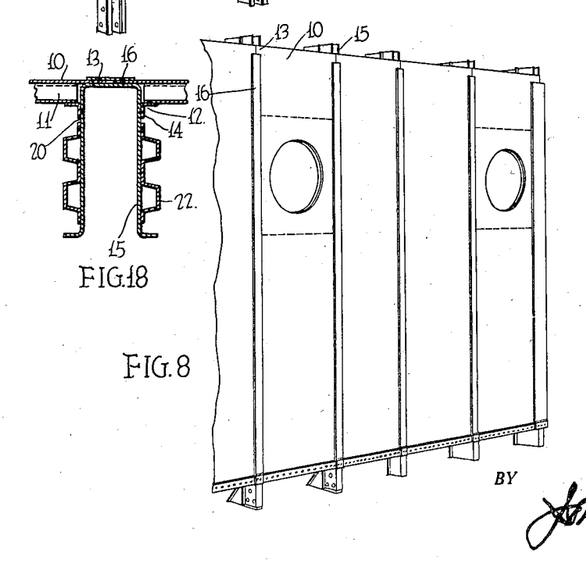
Fig. 8 is a front perspective view of a section of paneling.
Fig. 18 is a fragmentary detail horizontal section through one of the panel posts.
Figure 9:
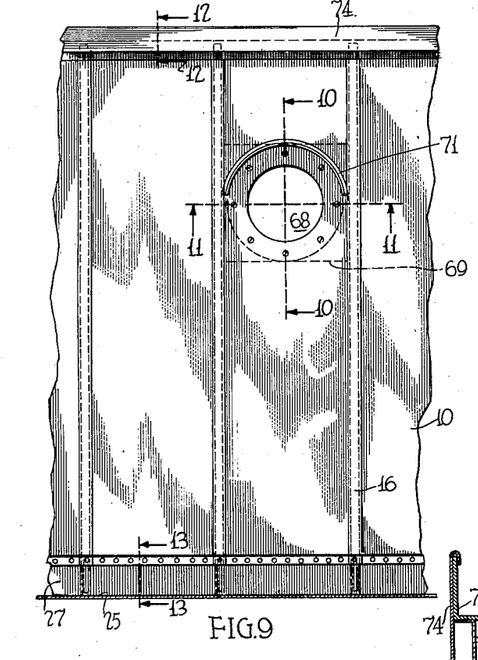
Fig. 9 is an outside plan view of a portion of the paneling showing an air port opening.
Figures 10, 14:
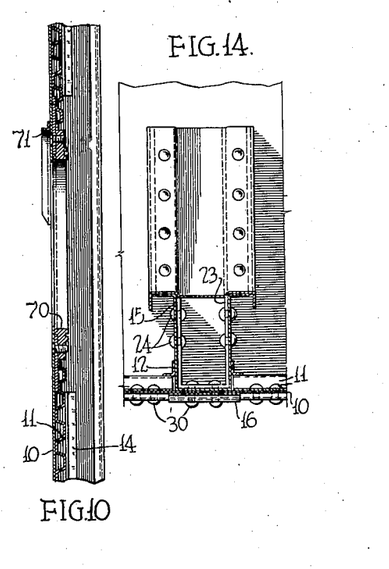
Fig. 10 is a section on line 10—10 of Fig. 9.
Fig. 14 is a section on line 14—14 of Fig. 13.
Figure 12:
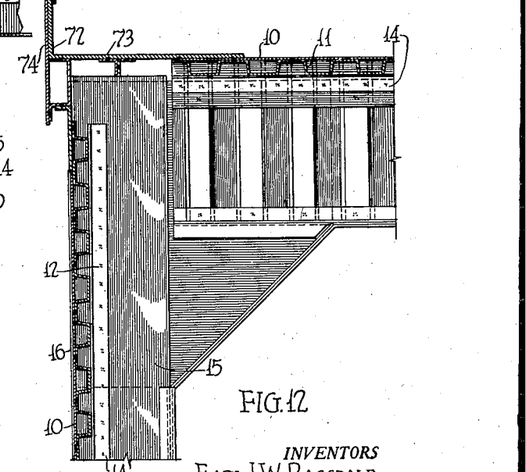
Fig. 12 is a fragmentary section on the line 12—12 of Fig. 9 greatly enlarged.
Figure 19:
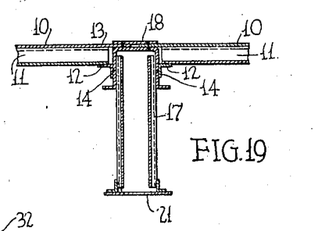
Fig. 19 is a detail section of a typical joint between paneling and beam with butt strip.

The structure of the paneling used for the various side walls and deck floorings, is shown in its essence in Figs. 6, 7, 8, 10, 12 and 19, where it will be seen that the paneling element comprises an outer sheath 10 overlaid by an inner strip 11 of transversely corrugated sheet material with reinforcing angle strips 12 extending along the edges of the corrugated strip. The corrugated strip is spot welded to the strip of sheathing 10 by spot welds between the sheath 10 and the juxtaposed faces of the corrugations, while the stiffening angle strips 12 are spot welded to the corrugated strip across the corrugations through the outer faces of the corrugations near their ends. An edge flange 13 is formed at each edge of the panel by extensions of the sheath 10 beyond the edges of the corrugated strip, while other edge flanges 14 are formed by the outwardly extending sides of the angle strips 12. The three elements, sheathing, corrugated strip and angle strips thus form a substantially rigid strip of paneling with a pair of edge flanges 13—14 extending longitudinally along each edge of the panel and projecting substantially at right angles to each other. The flanges 13—14 permit the making of a firm spot welded connection of the edges of the panels with two angularly disposed faces of the posts, beams or girders according to whether the panels are to be used for wall paneling or deck flooring.

Where such paneling is used in the construction of side walls the side edges of the panels are connected to suitable up-right posts through the pairs of edge flanges 13—14, as shown in Figs. 7, 8 and 18, where 15 indicates one of a plurality of vertical posts between which the paneling strips are connected. As shown in Fig. 18, this connection is made by lapping the flange 13 of the panel over a portion of the bottom wall of the channel section post 15, which brings the flange 14 of the panel into overlapping engagement with one side wall of the post, the portions thus brought into overlapping relation being spot welded together. Two such strips of paneling are connected to the post on either side with their flanges 13 in close proximity to each other along the bottom wall of the post preferably out of abutting relation with each other. The seam between the two edges of the paneling is then covered over with a butt strap 16 secured thereto by spot welds passing through the several overlapping elements.

Where the paneling is used for deck flooring it is laid over the various beams and girders as shown in Figs. 4, 12 and 19. Here an edge flange 13 of the panel overlaps a top edge of a beam 17, while the flange 14 overlaps a side wall of the beam, the parts thus being brought into overlapping engagement being spot welded together through their overlapping portions. To produce a closed seam, the edge flanges 13 of the sheathing may be brought into close proximity along the central line of the beam without abutting, and the open seam closed by a butt strap 18, or the juxtaposed flanges 13 of successive panels may simply overlap along the top edge of the beam, and the whole secured together by spot welds through the three overlapping members, that is, the two overlapping extensions of the sheathing and the top wall of the beam as indicated in Figs. 3 and 4.

Figure 11:
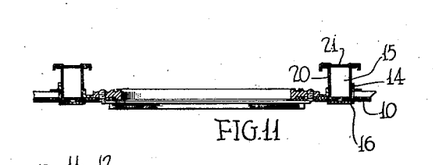
Fig. 11 is a section on the line 11—11 of Fig. 9.
Figure 25:
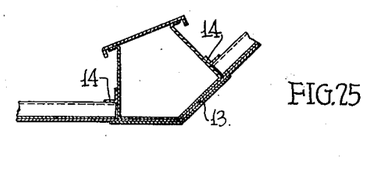
Fig. 25 is a fragmentary horizontal section through the corner post of a section of panel.

The posts 15 are especially adapted to co-operation with the panel elements for forming the side walls of the superstructure in that they are formed each of a channel section member 20 (Fig. 11) arranged to be closed by cover strip 21 to form a closed box section after the flanges 16 and 14 of the panel sections have been spot welded thereto, access to the interior of the channel member 20 being had through the open side of the channel member before applying the cover strip. To enable the cover strip to be readily applied with a secure joint, the side walls of the channel member are flanged outwardly for flat overlapping engagement with the cover strip between the stiffening flanges of the cover. Further stiffening of the covering strip is afforded by offsetting its central portion inwardly to fit in between the edges of the trough member 20 as shown in Fig. 11. Thus all the spot weld joints between the post, the flanges of the partition element and the cover strip are through flatly engaging overlapping portions. By joining the panel member to the post member, through the flanges 13 and 14 extending at right angles to each other, any stresses on one spot welded joint causing a pulling stress on a set of spot welds of one flange will be resisted by the shear resistance of the spot welds of the other flange. Where certain portions of the side walls require extra reinforcement, the posts 15 may be formed with a deeper channel member 20 as shown in Fig. 18, and the sides of the channel member reinforced by a suitable corrugated strip 22 spot welded to the sides thereof. Where the side walls join at an obtuse angle, the vertical post takes the form shown in Fig. 25 where it will be seen that the post is constructed in a manner similar in all respects to that above described except that the channel section member of the post has its bottom wall formed with two angularly disposed faces, with each side wall arranged at right angles to the adjacent faces of the bottom wall so as to receive the right angularly disposed flanges 13—14 of the panel elements.

Figure 13:
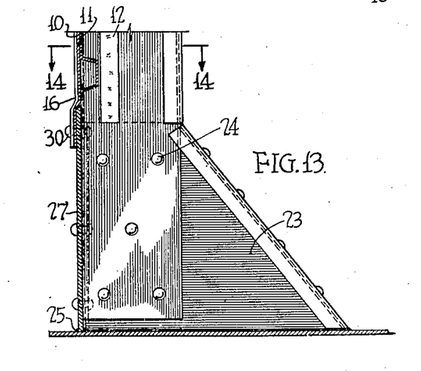
Fig. 13 is a fragmentary section on the line 13—13 of Fig. 9 on a larger scale.
Figure 32:
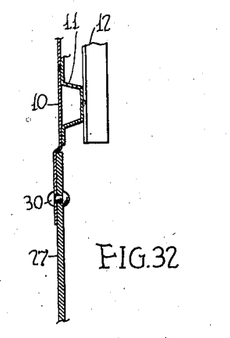
Figure 32 is a similar view showing an alternative such connection.

In order to secure the bottoms of the posts to an existing carbon steel structure, such as the deck of the ship, the bottoms of the posts are provided with joining members 23 (Figs. 13 and 14) in the form of footings of enlarged bottom area, formed from carbon steel and riveted or otherwise secured to the bottoms of the posts, preferably by rivets 24, or other suitable method of connection which may be effected without having to subject the stainless steel of the post to the amount of heat which would be necessary to weld the relatively thick low carbon steel member 23 thereto. The lower end of the footing 23 is secured to the carbon steel deck structure by arc welding as indicated at 25. Similarly where a joint is to be made between the panel and an existing coaming of carbon steel 26 (Fig. 31) the wall section containing several paneling elements as indicated in Figs. 7 and 8 is provided at its lower edge with an insert 27 of stainless steel of a gauge substantially equal to the gauge of the coaming 26, the insert 27 being spot welded between the outer sheathing 10 and an inner strip 28 inserted along the bottom of the paneling between the outer sheath and the inner corrugated panel element 11. The insert 27 may be joined to the existing low carbon steel coaming 26 by arc welding as indicated at 29. Alternatively the insert 27 may be secured to the bottom edge of the sheathing 10 by any known or other suitable form of cold connection, as for example, by rivets as indicated at 30 in Fig. 32.

Figures 17, 33:
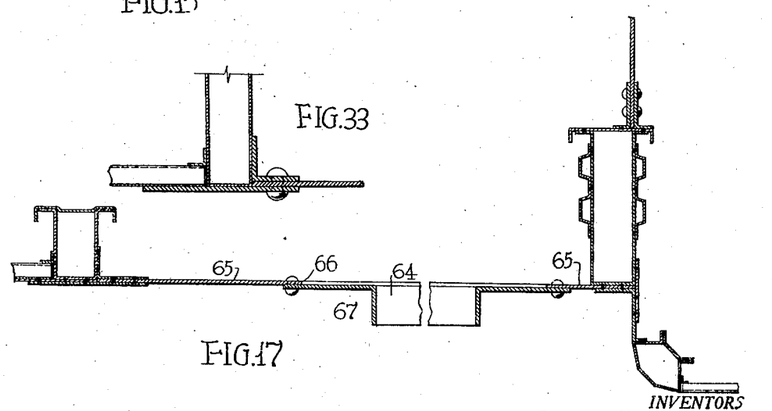
Fig. 17 is a section on the line 17—17 of Fig. 15.
Figure 33 is a horizontal section showing a method of attachment of the end post of the stainless steel wall panel to a carbon steel wall panel.
Figure 26:
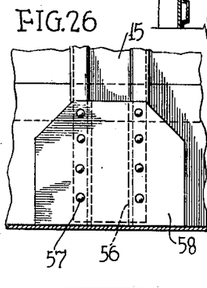
Fig. 26 is a fragmentary inside plan view of a joint connecting the base of a panel post with the ship's deck.
Figure 27:
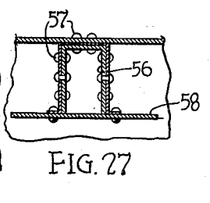
Fig. 27 is a section taken on the line 27—27 of Fig. 26.
Figure 28:
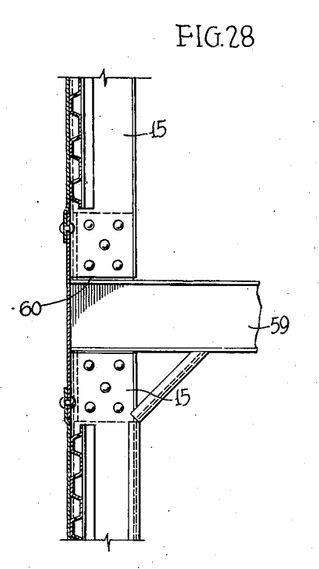
Fig. 28 is a fragmentary side elevation partly in section showing the connection of a stainless steel paneling with a carbon steel beam.
Figure 29:
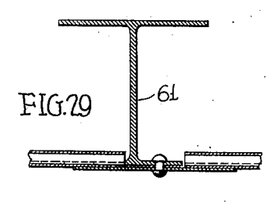
Fig. 29 is a horizontal section showing connection of stainless steel paneling with carbon steel column.
Figure 30:
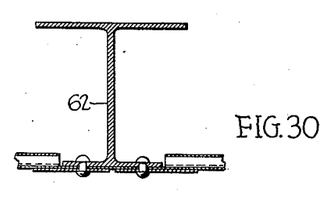
Fig. 30 is a horizontal section showing a modified form of connection between stainless steel paneling and carbon steel column.

Other methods of joining parts of the stainless steel structure to an existing carbon steel structure are illustrated in Figs. 26 to 30 and 33. In Figs. 26 and 27, is shown a joint for connecting a partition post 15 to the ship's deck, which takes the form of a short up-right post 56 of channel section fitted inside the channel element 20 of the post 15 and secured thereto by rivets 57 and likewise to a plate 58 of low carbon steel, the latter to be arc welded to the low carbon steel deck of the ship.

Where the posts 15 are to be joined to an existing horizontal beam or girder 59 (Fig. 28) they are likewise joined through joining members 60 of low carbon steel riveted to the posts and arc welded to the girder 59. Figs. 29 and 30 show methods of joining the paneling sections to existing carbon steel pillars 61 and 62. Fig. 33 illustrates the method of attaching such a carbon steel joint member to the end post of a side wall section.

The beams and the girders which in cooperation with the typical paneling elements form the decks of the superstructure are especially adapted to being given any desired camber in their fabrication without variation in the form of their constituent elements. A typical beam and girder are shown in Figs. 20, 21, 23 and 24.

Referring first to the construction of a beam such as indicated at 31, this comprises a top chord member 32 of downwardly facing channel section and a pair of bottom chord members 33 and 34 of angle section each of the latter members being arranged with one side extending upwardly in the plane of the adjacent side of the channel section top chord member and the other side extending outwardly of the beam to form a lateral extending flange. The upper and lower chord members are joined by a pair of sheet metal web members 35 and 36 corrugated transversely of the beam, each connecting one of the bottom chord members 33 or 34 with the adjacent side of the top chord member. The corrugations of the web members extend transversely of the beam between the top and bottom chord members and are of such cross sectional contour as to form a series of ribs or corrugations with flat faces of a width greater than the depth of the corrugations, preferably at least four times the depth of the corrugations. By thus forming the web members of corrugated sheet material, the web members may be placed between the top and bottom chord members at any camber of the chord members, the fluted or corrugated form of the web member enabling it to assume the camber of the chord members without buckling.

Figure 20:
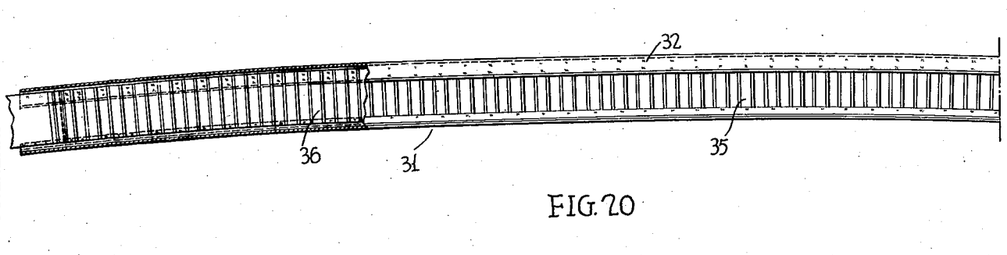
Fig. 20 is a side elevation of a portion of cambered deck beam.

This renders the fabrication of such a cambered beam as illustrated in Fig. 20 extremely simple. The sheet metal top or bottom chord members 32 and 33—34 being of resilient, high tension stainless steel (18 and 8 alloy) may be readily held in the desired cambered position in a suitable jig while the web members 35 and 36 are fitted in between the chord members and secured in place by spot welds 37 between the overlapping portions of the relatively wide flat surfaces of the corrugations and the chord members. After the web and chord members are thus joined, and the paneling elements spot welded to the top chord of the beam as previously described in connection with Fig. 19, the bottom cover strip 38 is spot welded on to the bottom faces of the chord members 33—34 completing the box section beam. By making the corrugations with their outer faces flat and sufficiently wide to facilitate spot welding to the chord members, with relatively shallow depth, a compromise is effected between vertical shear strength and longitudinal shear strength of the web, while affording sufficient depth to permit warping of the web into the camber of the chord members without buckling.

Figure 5:
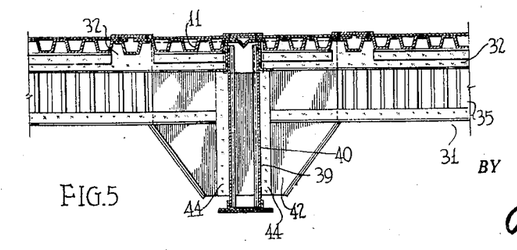
Fig. 5 is an enlarged fragmentary section taken on the line 5—5 of Fig. 3.
Figure 6:
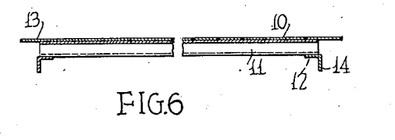
Fig. 6 is a detail of the paneling structure in transverse section and partly broken away.
Figure 21:
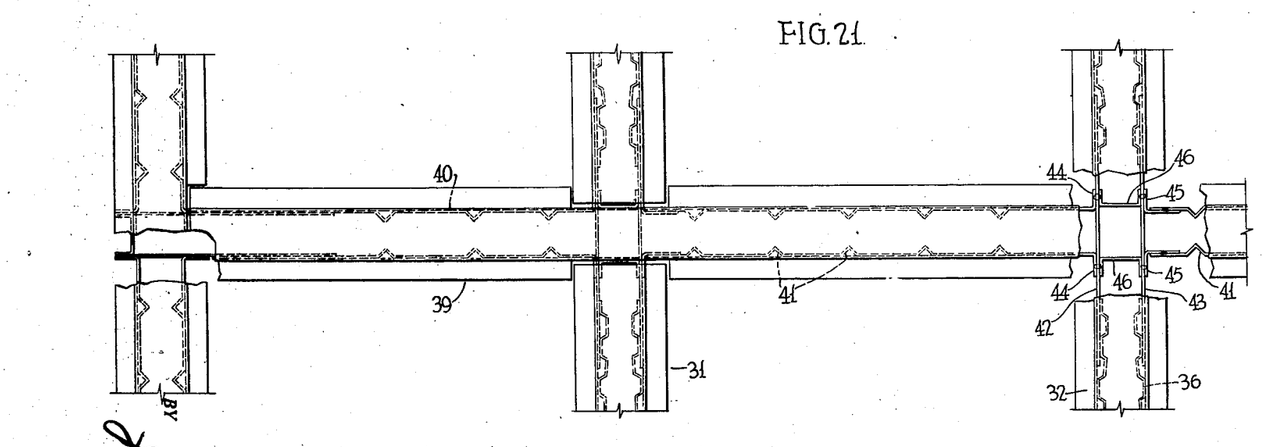
Fig. 21 is a fragmentary top plan view showing the intersection of transverse, cambered beams with longitudinal girder.
Figure 22:
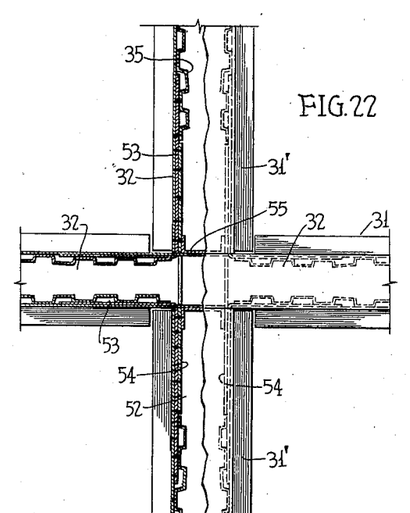
Fig. 22 is a fragmentary plan view of an intersecting joint between beams.
Figure 23:
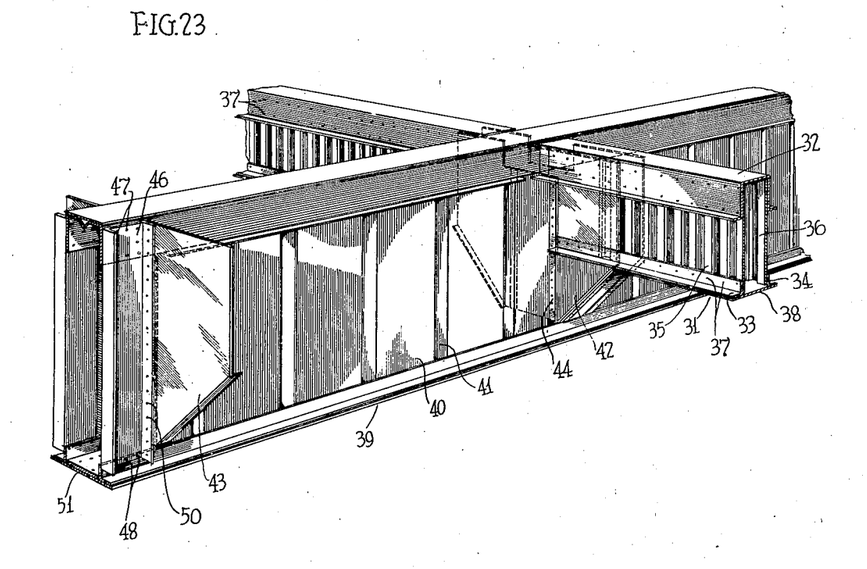
Fig. 23 is a perspective view of joint at the intersection of a beam and girder.
Figure 24:
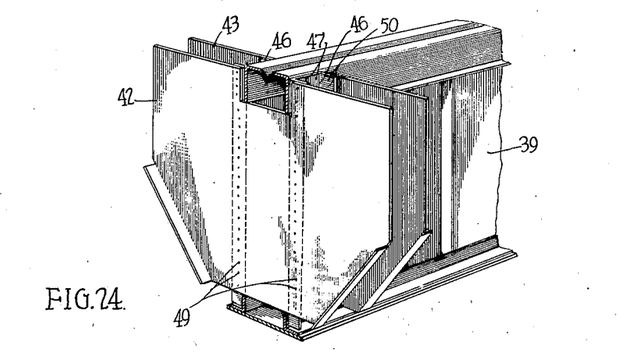
Fig. 24 is a fragmentary perspective view of a portion of the joint shown in Fig. 23.

The large beams or girders 39 are formed in a manner similar in all respects to that of the beams of 31, and involve the same principle of construction, except that the sheet metal web members 40 are formed with their flat surfaces on one side of the webbing with intervening ribs or beads extending toward the other side, the flat faces being extremely wide in proportion to the depth of the ribs or beads. Here also the intervening shallow ribs or beads 41 are not too deep to detract from longitudinal shear strength, but are of sufficient depth to stiffen the web against vertical shear, at the same time permitting the girder to be formed with a camber such as that of the beam 31 (Fig. 2) without buckling of the web members.

Where the beams and girders intersect or abutt, as in Figs. 21 or 23, the joint is effected by discontinuing the beam where it intersects the girder so that the adjacent ends of the two separate beam portions abutt opposite faces of the girder. The joint between the beam sections and the girder comprises a pair of gusset plates 42 and 43 extending through an opening in the web 40 of the girder in overlapping engagement with outwardly extending flanges 44 and 45 formed at the side edges of the opening in the web of the girder. The gusset plates 42 and 43 extend outwardly of the girder into overlapping engagement with the inside walls of the chord members and the outside surfaces of the web members of the beam 31. The flanges 44 are formed from integral portions of the web member while for purposes of adjustment the flanges 45 are formed by separate angle pieces spot welded to the web members of the girder. To further reinforce the joint, a reinforcing member 46 of channel section is fitted between the gusset plates 42—43 with its bottom wall spot welded to the top and bottom chord members of the girder as indicated at 47 and 48, and its side walls spot welded to the gusset plates 42 and 43 as indicated at 49 and 50. Joints, such as shown in Figs. 20, 21 and 23 occur in the finished superstructure in the manner shown in Figs. 3, 4 and 5 where the relation of certain girders 39 and beams 31 are clearly shown. Fig. 3 shows a girder 39 running longitudinally through the center of the superstructure deck with intersecting beams 31 extending transversely of the deck. The relation of the parts constituting the complete structure including the deck flooring, in the neighborhood of the junction between a girder 39 and beam 31, is clearly shown in Figs. 4 and 5. It will be noted upon reference to Figs 4 and 5 that before attachment of the cover strips 38 and 51 of the beam 31 and girder 39, respectively, ready access is had through the open bottoms of the beams and girders for spot welding the panel elements on to the channel bottoms and sides of the beams and girders before the cover strips are applied.

Where it is desired to join two intersecting beams 31, the joint shown in Fig. 22 is used. In this figure, the portion to the right of the irregular line 52 is a full plan view of the joint while the portion to the left of the line 52 is broken away in section on a horizontal plane through the top chord members of the beams just above the flanges of such top chord members. The beams are identical in structure, but to distinguish one from the other at the intersecting joints, one of the beams is designated 31 while the other is designated 31'. The top chord member 32 of the beam 31 continues through the joint with the exception of its flanges which are cut away where the beam passes through the joint. The beam 31' is discontinued at the joint so as to have the two sections terminate at the sides of the beam 31. The two sections of the beam 31' are secured to the beam (Fig. 22) by angle strips 53 extending around in overlapping engagement with the inner faces of the side walls of the top chord members 32 of both the beam 31 and the abutting sections of the beam 31', the angle plates 53 being spot welded to the overlapping surfaces. Further reinforcing connection between the abutting sections 31' and the continuous beam 31 is effected by the straight gusset plates 54 which extend transversely through the beam 31 into overlapping engagement with those portions of the angle strips 53 which extend into the sections of beam 31', and are spot welded thereto.

Figure 1:
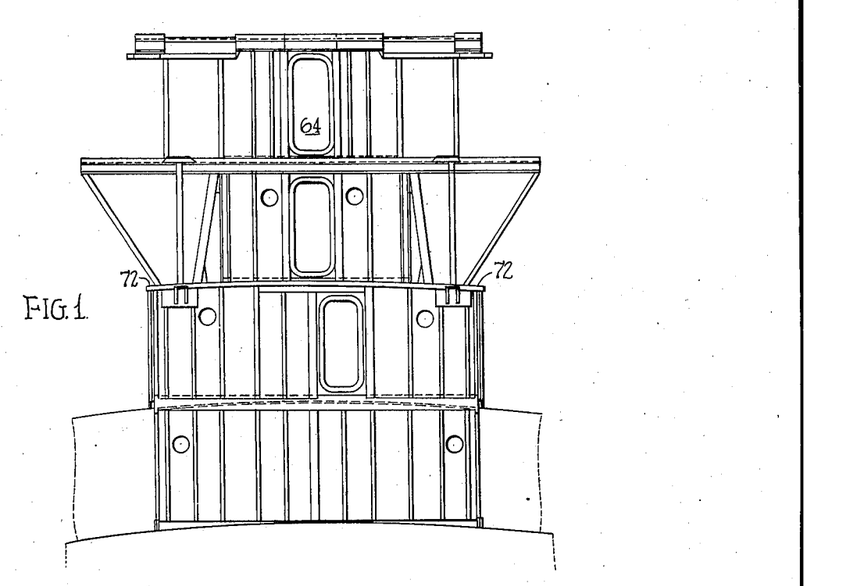
Fig. 1 is a rear elevation of a ship's superstructure embodying the invention.
Figure 2:
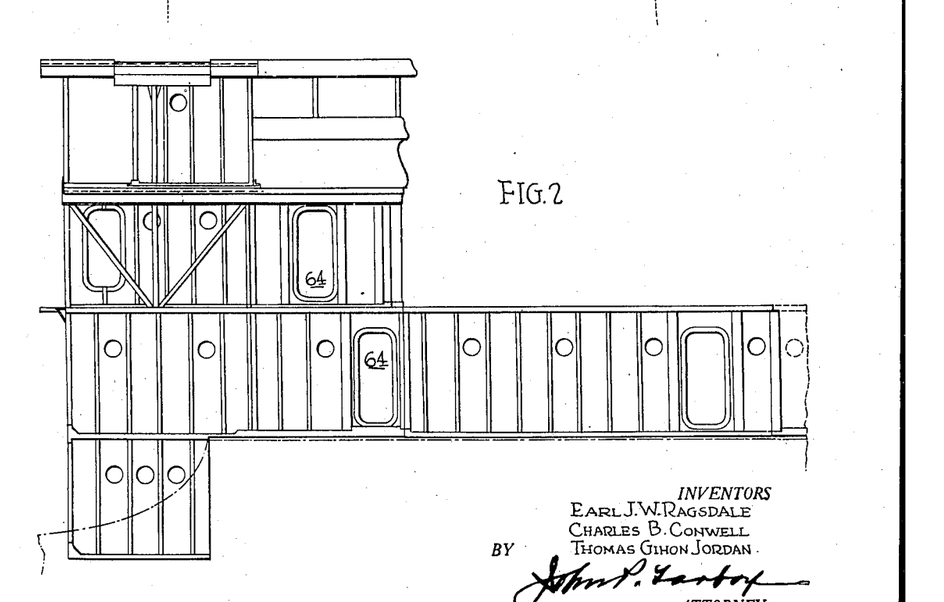
Fig. 2 is a side view looking from the right in Fig. 1.
Figure 15:
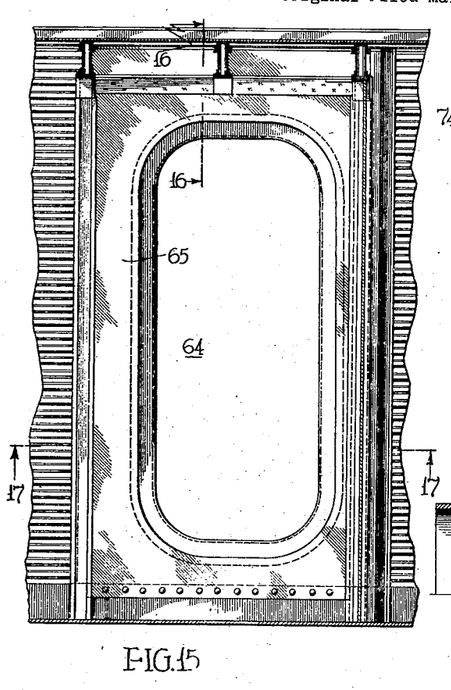
Fig. 15 is an inside plan view of the panel section containing a door opening.

Further reinforcement and joindure is effected by a pair of vertically positioned joining posts 55 of channel section having their bottom walls spot welded to the side walls of the top and bottom chord members 32 and their side walls spot welded to the gusset plates 54. Where the angle plates 53 pass out of the continuous beam 31 into the sections of beam 31', they are notched in the plane of the side wall of the beam 31 so as to fit around the side wall and avoid having to make a break in the side wall. Similarly, the gusset plates 54 are also notched to permit the side walls of the top chord member of the beam 31 to pass continuous through the joint, the latter notches may be wide enough to receive the full width of the top chord member 31 in the same manner as that shown for the gusset plates 42—43 in Fig. 24.

Where door openings 64 occur in the side walls of the structure as indicated in Figs. 1, 2 and 15, the paneling surrounding the door is comprised of a single plate 65 having an aperture 66 provided with a flanged door framing 67, the plate 65 and door frame 67 being relatively heavy gauge. Likewise, where the windows or air ports 68 occur in the side walls of the structure, the corrugated paneling is discontinued and a relatively heavy sheet 69 inserted containing the air port opening. This sheet 69 extends the full width between posts 15 as shown in Fig. 11. The opening in sheet 69 is provided with a suitable circular frame element 70 and weather shed 71.

Figure 16:
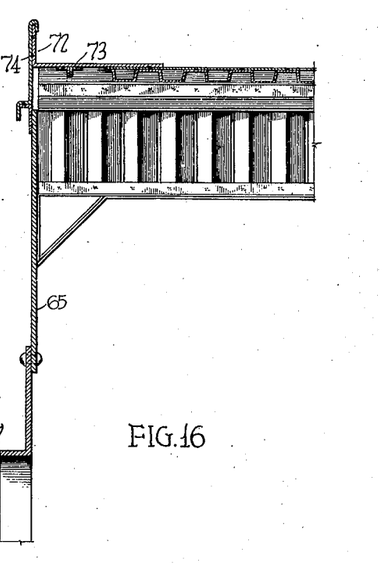
Fig. 16 is a section on the line 16—16 of Fig. 15.

All around the structure where the edges of a non-housed portion of the deck terminate flush with the plane of the outer wall faces of the deck housing below, as at 72 in Figs. 1, 12 and 16, a coaming is provided by a strip 73 of angle section arranged to overlap the edge portion of the deck and extend upwardly to form the inner faces of a coaming, the outer faces of the coaming being formed by a suitable front strip 74 extending up from the front face of the angle strip 73 and around over the top edge of the latter and spot welded thereto as indicated in Figs. 12 and 16.

While certain specific embodiments of the invention have been discribed herein for the purpose of disclosure, it is to be understood that the invention is not limited to such specific embodiments, but contemplates all such variations and modifications thereof as fall fairly within the scope of the appended claims.

Having thus described the invention, what we claim is:

1. A sheet metal housing structure comprising a pair of spaced frame elements of channel section, a flat sheet metal panel connecting said frame elements and spot welded thereto in overlapping engagement with the back walls of said frame elements, a panel of corrugated sheet metal spot welded to said flat panel and extending between said frame elements with the corrugations substantially normal to the frame elements, and strips of angle section arranged with one side spot welded to the corrugated panel along the surface thereof remote from the inner surface of the flat panel to form with the edge of the flat panel and the corrugations an open trussed beam and the other side of the angle-section strip spot welded to a side wall of said frame element.

2. A metallic building structure, comprising a plurality of substantially rigid panel units each comprising a substantally flat sheet, transverse reinforcements constituted by a corrugated sheet fastened to the flat sheet with the corrugations terminating short of the side margins of the flat sheet, a sheet metal angle-section strip connecting the corrugations at their ends to form an open truss beam structure along each side of the panel and a plurality of frame elements of channel section having the bottom of the channel abutting the marginal edges of adjacent panel units and one edge of the angle section strip abutting a side of the frame element.

3. A panel for metallic building structures as claimed in claim 26 in which the transverse reinforcements are interrupted intermediate the ends of the panel and a relatively heavy flat sheet provided with an opening is secured in the interrupted portion, said heavy sheet extending the full width of the transverse reinforcements.

4. In combination, a spot welded building structure comprising a sheet metal frame element of channel section, a substantially rigid panel unit comprisng a flat sheet having transverse reinforcements constituted by a corrugated sheet spot welded to the flat sheet with the corrugations terminating short of the side margins of the flat sheet and a sheet metal angle strip spot welded to the corrugations at their ends to form an open truss beam structure along each side of the panel, a side margin of the flat sheet being spot welded to the outside of the bottom wall of the channel-section frame element and said angle strip being spot welded to the outside of a side wall of the channel section frame.

5. In combination a spot welded building structure as claimed in claim 4 having a cover strip spot welded over the open side of the channel-section frame element.

6. A metallic building structure comprising sheet metal frame elements of channel section, preformed panel units one of which has a window opening, each having a pair of edge flanges extending at right angles to each other, two of said panel units being spot welded to a channel-section frame element each through one of its edge flanges in overlapping engagement with the outside of the bottom wall of said channel-section frame element at points of overlap accessible from opposite sides and with the adjacent edges of the flanges spaced apart, the other flange of each panel unit being substantially continuous throughout the length of the panel excepting the region of window openings and being spot welded to a side wall of the channel-section frame element at points of overlap accessible from opposite sides, and through substantially the entire length of the frame element.

EARL J. W. RAGSDALE.
CHARLES B. CONWELL.
THOMAS GIHON JORDAN.